(12) United States Patent
Mozer

(10) Patent No.: US 8,036,901 B2
(45) Date of Patent: Oct. 11, 2011

(54) SYSTEMS AND METHODS OF PERFORMING SPEECH RECOGNITION USING SENSORY INPUTS OF HUMAN POSITION

(75) Inventor: Todd F. Mozer, Los Altos Hills, CA (US)

(73) Assignee: Sensory, Incorporated, Santa Clara, CA (US)

( * ) Notice: Subject to any disclaimer, the term of this patent is extended or adjusted under 35 U.S.C. 154(b) by 1013 days.

(21) Appl. No.: 11/973,140

(22) Filed: Oct. 5, 2007

(65) Prior Publication Data

US 2009/0094032 A1    Apr. 9, 2009

(51) Int. Cl.
*G10L 11/00* (2006.01)
*G10L 21/00* (2006.01)
*G09G 5/00* (2006.01)
*G06K 9/62* (2006.01)

(52) U.S. Cl. .......... 704/270.1; 345/7; 345/8; 345/672; 382/103; 704/231; 704/275

(58) Field of Classification Search .......... 704/270.1
See application file for complete search history.

(56) References Cited

U.S. PATENT DOCUMENTS

| 6,292,158 B1 * | 9/2001 | Amafuji et al. .......... 345/7 |
| 2003/0046087 A1 | 3/2003 | Johnston et al. |
| 2006/0013440 A1 | 1/2006 | Cohen et al. |

OTHER PUBLICATIONS

International Search Report (from corresponding PCT application), PCT/US08/77742, mailed Dec. 2, 2008.

\* cited by examiner

*Primary Examiner* — Justin Rider
(74) *Attorney, Agent, or Firm* — Chad R. Walsh; Fountainhead Law Group P.C.

(57) ABSTRACT

Embodiments of the present invention improve methods of performing speech recognition using sensory inputs of human position. In one embodiment, the present invention includes a speech recognition method comprising sensing a change in position of at least one part of a human body, selecting a recognition set based on the change of position, receiving a speech input signal, and recognizing the speech input signal in the context of the first recognition set.

15 Claims, 7 Drawing Sheets

SYSTEMS AND METHODS OF PERFORMING SPEECH RECOGNITION USING SENSORY INPUTS OF HUMAN POSITION

BACKGROUND

The present invention relates to speech recognition, and more particularly, to systems and methods of performing speech recognition using sensory inputs of human position.

Electronic devices have become more readily available to the public and people find themselves interfacing with many different electronic devices during their daily lives. Historically, the adoption of an electronic device required the user to spend considerable time learning to interface with the device. The advent of menu driven interfaces helped to alleviate some of the tedium of learning to interface with an electronic device, but this method of interfacing with an electronic device still required a person to learn where the menus were and how to use them. More recently, the tactile and motion interfaces have attempted to make the experience of using an electronic device more intuitive. Although the advancements in tactile and motion devices have improved the experience of interfacing with an electronic device, the user is still constrained by the use of visual cues to maneuver through the options and functions of the electronic device. Due to this limitation, the user may still be required to spend a great deal of time learning to interface with the electronic device. Speech recognition would help improve the interface immensely by allowing the user to tell the device what task was desired. Historically however, effective speech recognition requires large amounts of memory and uses a considerable time to "recognize" a given utterance. In this way, the historical speech recognition methods may simply add to the frustration of interfacing with an electronic device rather than facilitate its use. These factors, as well as many others, have prevented the use of speech recognition in electronic devices.

The present invention solves these and other problems with systems and methods of performing speech recognition using sensory inputs of human position.

SUMMARY

Embodiments of the present invention improve methods of performing speech recognition using sensory inputs of human position. In one embodiment, the present invention includes a speech recognition method comprising sensing a change in position of at least one part of a human body, selecting a recognition set based on the change of position, receiving a speech input signal, and recognizing the speech input signal in the context of the first recognition set.

In one embodiment, the change of position includes a change in orientation.

In one embodiment, the change of position includes a change in direction.

In one embodiment, the change of position includes a portion of a human hand proximate with a surface.

In one embodiment, the change of position includes motion.

In one embodiment, the speech input signal is a portion of an utterance.

In one embodiment, the recognizing includes choosing an element from the first recognition set.

In one embodiment, the recognizing includes using the first recognition set to weight a set of likelihoods, wherein the first recognition set includes segments of speech.

In one embodiment, the method further comprises initiating a state of a computer program, and selecting a state recognition set based on the state of the computer program, wherein the selecting of the first recognition set includes finding a subset of the state recognition set.

In one embodiment, the method further comprises changing the state of the computer program according to the recognition result.

In one embodiment, the speech input signal includes digital data.

In one embodiment, the sensing includes the use of a tactile sensor.

In one embodiment, the sensing includes the use of a gyroscope.

DETAILED DESCRIPTION

Described herein are techniques for a content selection systems and methods using speech recognition. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
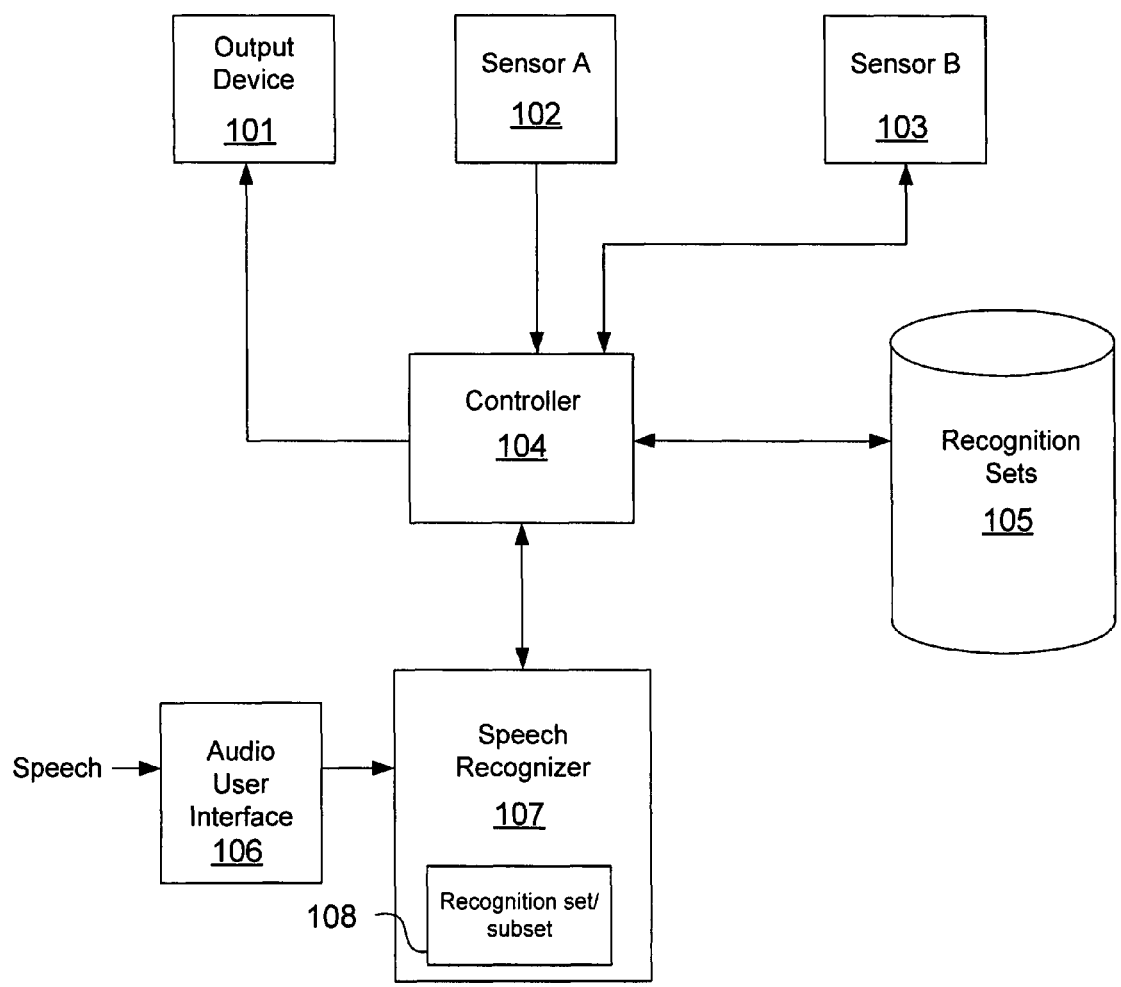
FIG. 1 illustrates a system for performing speech recognition using sensory inputs of human position according to one embodiment of the present invention.

FIG. 1 illustrates a system for performing speech recognition using sensory inputs of human position according to one embodiment of the present invention. System 100 includes an output device 101, a sensor A 102, a sensor B 103, a controller 104, a repository of recognition sets 105, an audio user interface 106, and a speech recognizer 107. The sensor A 102, sensor B 103, or both sensors receive signals indicating a change of position of at least one part of the human body. This change in position may include a change in orientation, direction, posture, or position, for example. The sensor may be sensing the direction a person's head is facing, for example. Also the sensor may be sensing the orientation of a person's hand, arm or leg, as another example. The change in position may also include motion. For example, the sensor may sense the speed at which the hand moves or how fast the feet are engaging a surface during a running exercise. The sensor may be a tactile sensor, a motion sensor, or any other sensor which can sense a change of position of at least one part of the human body. For example, a surface computing device may sense the arms on the surface and at the same time a finger moving substantially along the surface. Surface computing is the use of a specialized computer GUI (Graphic User Interface) in which traditional GUI elements are replaced by intuitive, everyday objects. Instead of a keyboard and mouse, the user interacts directly with a touch-sensitive screen, replicating the familiar hands-on experience of everyday object manipulation. In this example, the information of the relative positions of the arms, hands, and fingers in contact with the surface may be one type of input given by the sensor, and a finger motion on the surface may be another type of input given by the sensor. The change of position may be a portion of the human hand proximate with a surface (eg. touching the surface). The sensor B 103 may be an active sensor which may be configured to retrieve the information desired. For example, sensor B 103 may be an image sensor which may be configured to a bright light environment or a dark environment.

Controller 104 is coupled to sensor A 102 and/or sensor B 103. The controller receives the signals regarding changes in position of at least one part of a human body from at least one sensor. The controller is also coupled to select a first recognition set from repository of recognition sets 105 based on the change of position. The repository of recognition sets may be on a local hard drive, be distributed in a local network, or may be distributed across the internet, for example. The first recognition set may be a subset of another recognition set dictated by the state of the program running on the system. For example the, controller may be a game controller and may already have a recognition set selected corresponding to the state of the game. The recognition sets 105 may be word sets, segments of sounds, snippets of sounds, or representations of sounds. The controller is also coupled to a recognizer 107. The controller loads the first recognition set into the recognizer 107. A speech input is provided to the audio user interface 106. The audio user interface 106 converts the speech input into a speech input signal appropriate to be processed. This may be a conversion of the audio signal to a digital format, for example. The audio user interface 106 output is coupled to the recognizer 107. The speech recognizer 107 recognizes the speech input signal in the context of the first recognition set 108. The recognizer 107 may come up with a list of probable elements and weight the elements based on the segments of sounds in the first recognition set, for example. Alternately, the recognizer may simply use the elements in the first recognition set to compare to the speech input signal for a best match, for example. The smaller the first recognition set, the faster and more accurate the recognition can be. The controller receives the recognition result and processes the command or request. The controller is also coupled to an output device 101. The controller conveys the changes in the program flow to the output device 101. The output device 101 may be a video display which the controller may elect to depict a new state of a video game, for example. Also, the output device may be a control mechanism in a manufacturing line which the controller may command to change configuration, for example. Also, the output device 101 may be an audio output which the controller communicates alternatives to the user, for example.

Figure 2:
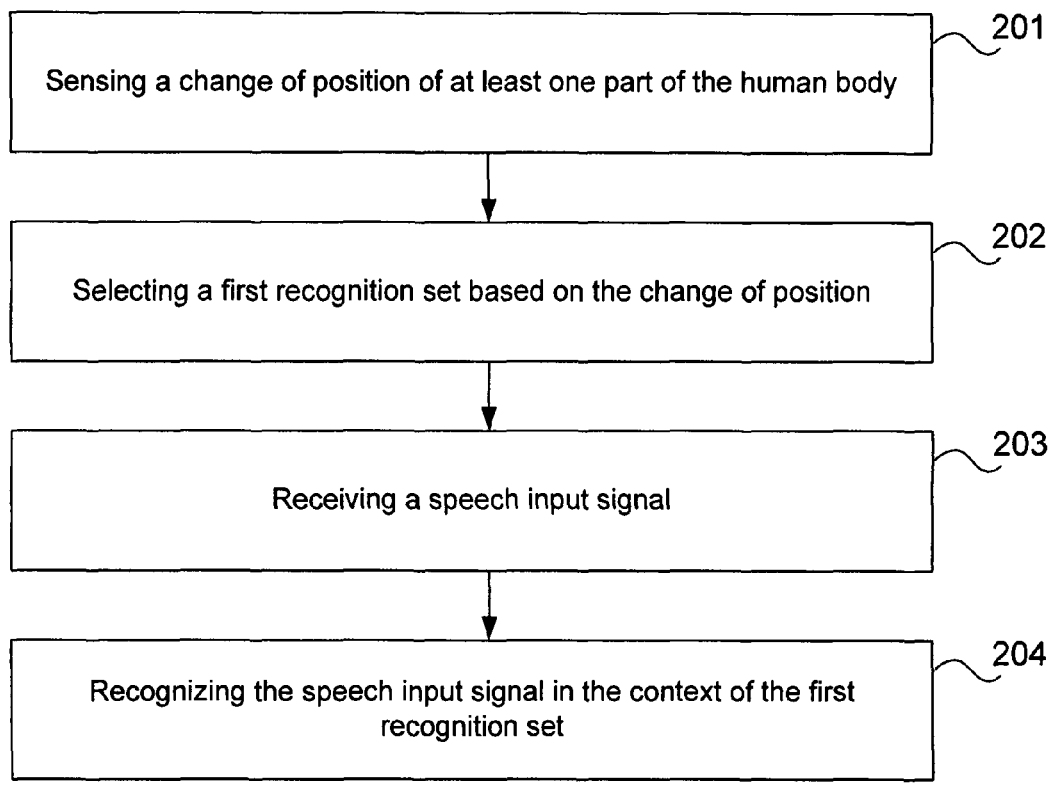
FIG. 2 illustrates a method for performing speech recognition using sensory inputs of human position according to one embodiment of the present invention.

FIG. 2 illustrates a method 200 for performing speech recognition using sensory inputs of human position according to one embodiment of the present invention. At 201, a change of position of at least on part of a human body is sensed. As mentioned earlier, the change of position may include a change in the direction a human is facing or an orientation of one or more parts of the human body, for example. At 202, a first recognition set is selected based on the change in position. The change in position may indicate that a certain command set be used, for example. In one example, a human being raises his hand while playing a video game and the program selects a first recognition set. The first recognition set may look like the following.

{shield, stop, duck, jump, map}

At 203, a speech input is received. The speech input signal may be a digital signal representing an utterance which was spoken by the user. At 204, the speech input signal is recognized in the context of the first recognition set. For example, a human being playing the video game described above may have said "shield up". This speech may be compared against the first recognition set to recognize the phrase, for example. In this example the element "shield" may be the recognition result which may allow the character in the video game to be protected by a shield.

Figure 3:
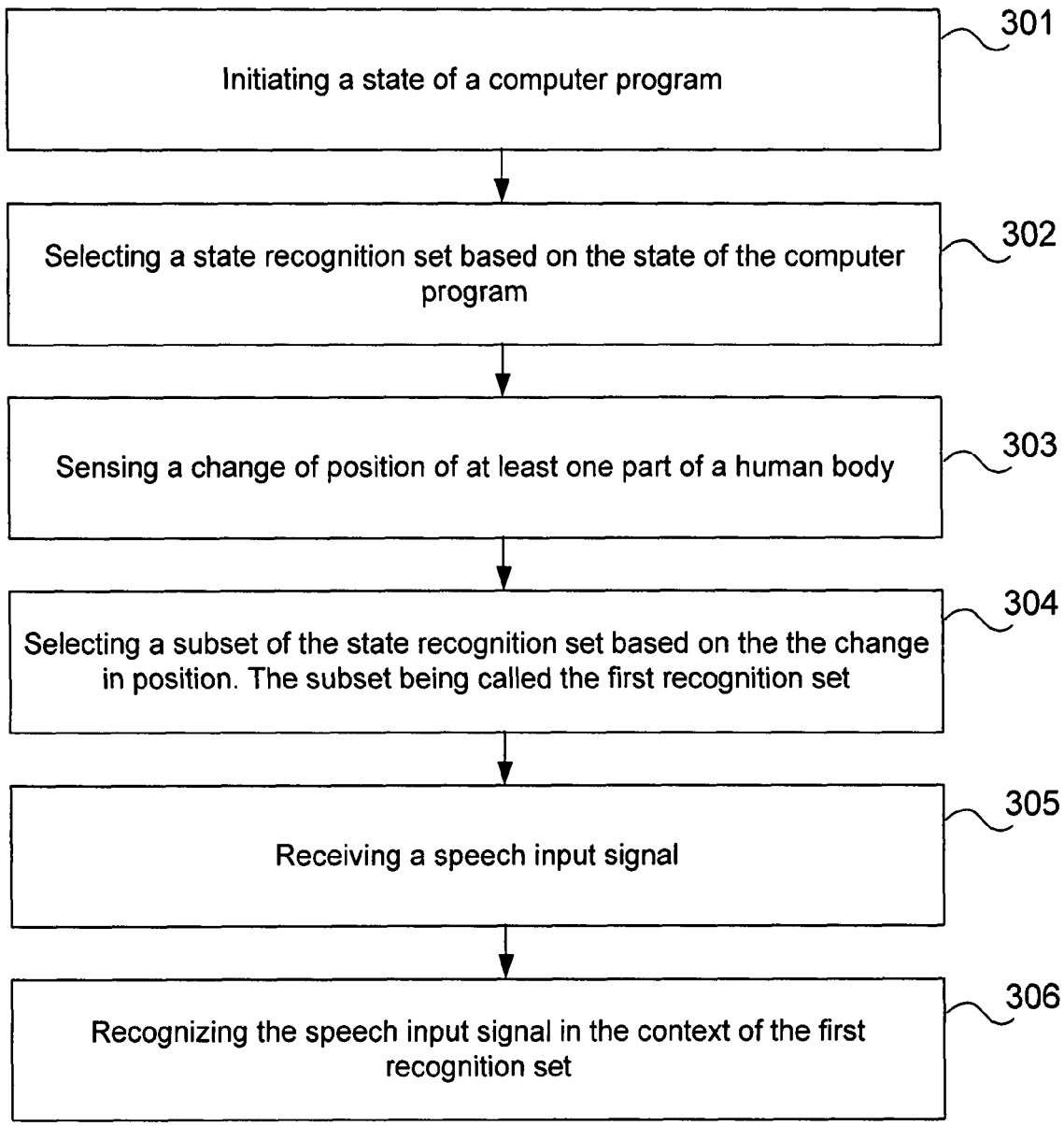
FIG. 3 illustrates another method for performing speech recognition using sensory inputs of human position according to one embodiment of the present invention.

FIG. 3 illustrates another method 300 for performing speech recognition using sensory inputs of human position according to one embodiment of the present invention. At 301, a state of a computer program is initiated. This may be a program sequence which is based on several previous inputs. For example, the video program mentioned above may initiate a state of the video game in which the user's character is making his way through a virtual forest. At 302, a state recognition set is selected based on the state of the computer program. The program may be at a point when only a limited number of options are available and in this way a recognition set may correspond to these options, for example. In the video game example, the user's character is making his way through a virtual forest and may have a state recognition set as follows.

{shield, stop, duck, jump, map, run, walk, left, right, sword, lance, climb tree, talk, ride, mount, borrow, steal, fire, call}

At 303, a change of position of least one part of a human body is sensed. This includes the examples of sensing a change of position mentioned previously. In the video game example, the user may change the position of his hand while holding a game sensor (eg. a game sensor 502 illustrated in FIG. 5 below). He may hold the game sensor 502 up so that his fingers are substantially vertical to one another (510). At 304, a first recognition set is selected based on the change in position, wherein the first recognition set includes finding a subset of the state recognition set. In the video game example, the subset of the state recognition set above would be selected based on the change of position. In this case, the subset may look as follows.

{shield, stop, duck, jump, map}

This would be called the first recognition set in this example. At 305, a speech input is received. The speech input signal may be a digital signal representing a portion of an utterance which was spoken by the user. At 306, the speech input signal is recognized in the context of the first recognition set. For example, a human being playing the video game, described above, may have said "stop". This speech may be compared against the first recognition set to recognize the phrase, for example. In this example, the element "stop" may be the recognition result which may allow the character in the video game to stop walking or running within the virtual forest.

Figure 4:
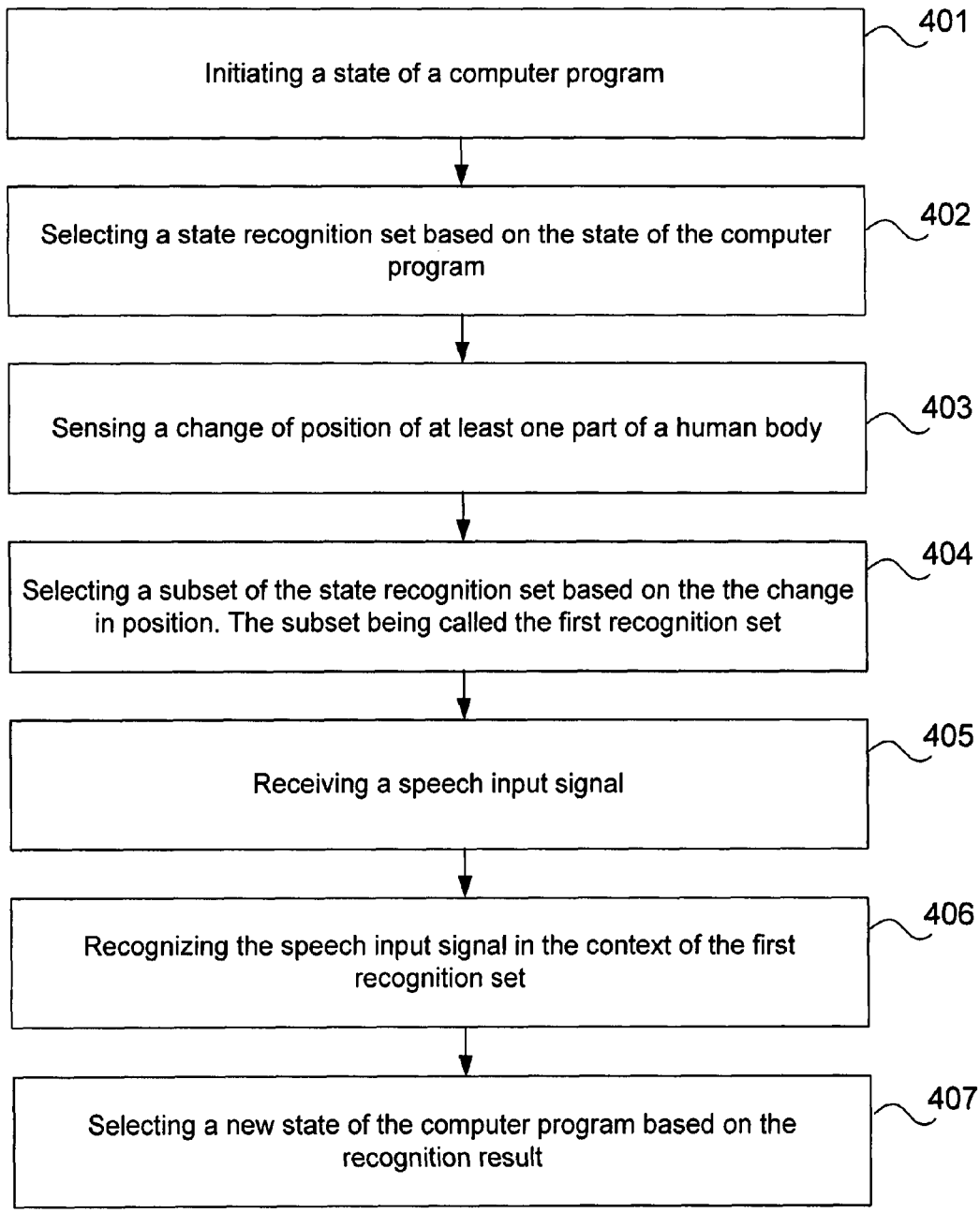
FIG. 4 illustrates another method for performing speech recognition using sensory inputs of human position according to one embodiment of the present invention.

FIG. 4 illustrates another method 400 for performing speech recognition using sensory inputs of human position according to one embodiment of the present invention. At 401, a state of a computer is initiated. This may be a program sequence which is based on several previous inputs. For example, the video program mentioned above may initiate a state of the video game in which the user's character is making his way through the courtyard of a virtual castle. At 402, a state recognition set is selected based on the state of the computer program. The program may be at a point when only a limited number of options are available and in this way a recognition set may correspond to these options, for example. In the video game example, the user's character is making his way through the courtyard of a virtual castle and may have a state recognition set as follows.

{shield, stop, duck, jump, map, run, walk, crawl, climb, up stairs, enter door, close door, enter window, close window, open crate, close crate, draw bridge, left, right, sword, knife, key, climb, talk, smile, sell, buy, call, lift veil}

At 403, a change of position of least one part of a human body is sensed. This includes the examples of sensing a change of position mentioned previously. In the video game example, the user may change the position of his hand while holding a game controller. He may hold the game sensor flat so that his palm is substantially facing down. At 404, a first recognition set is selected based on the change in position, wherein the first recognition set includes finding a subset of the state recognition set. In the video game example, the subset of the state recognition set above would be selected based on the change of position. In this case, the subset may look as follows.

{enter door, enter window, open crate, lift veil}

This may be called the first recognition set in this example. At 405, a speech input is received. The speech input signal may be a digital signal representing an utterance which was spoken by the user. At 406, the speech input signal is recognized in the context of the first recognition set. For example, a human being playing the video game described above may have said "enter door". This speech may be compared against the first recognition set to recognize the phrase, for example. At 407, a new state of the computer is selected based on the recognition result. In the video game example, the element "enter door" may be the recognition result which may prompt the video game to select a new state of the video game program based on the recognition result "enter door". This new state of the video game may be initiated and the program may display the room entered on the video screen. Also the video game program may select a new state recognition set based on the new state of the video game program and continue the method all over again.

Figure 5A:
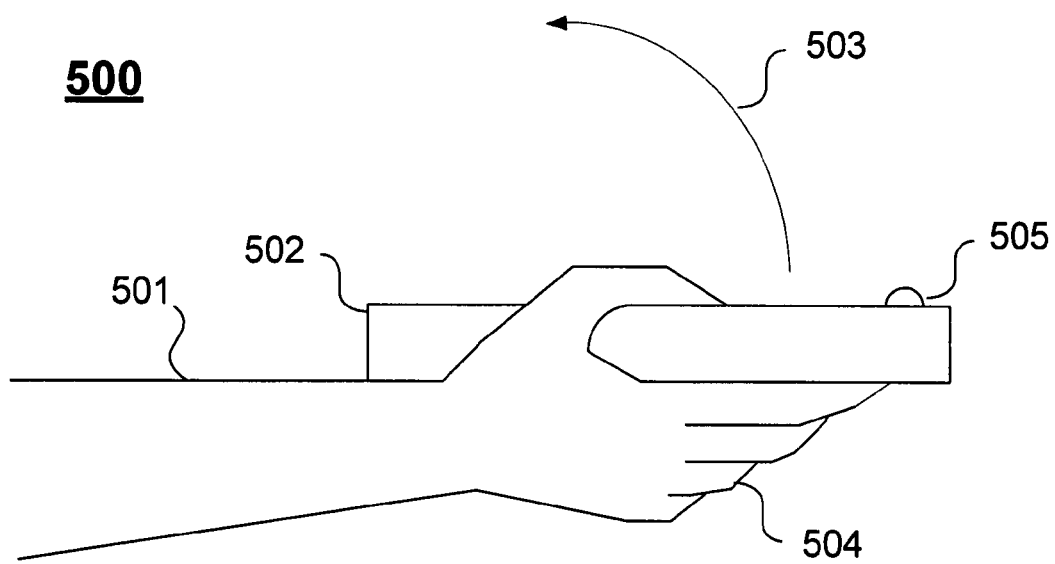
FIGS. 5A and 5B illustrates an example of how the position of a human hand may be used for performing speech recognition according to one embodiment of the present invention.
Figure 5B:
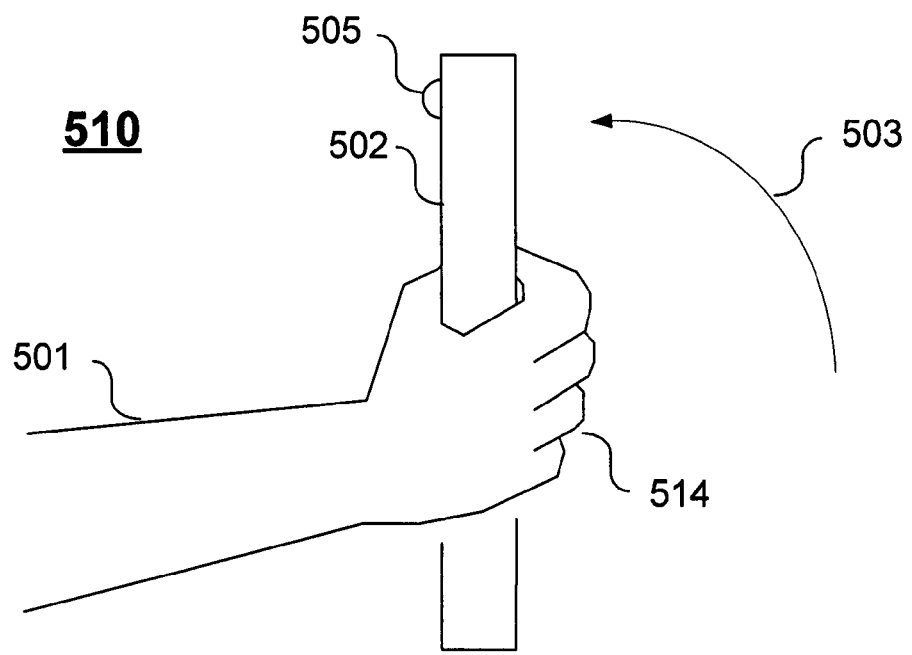

FIGS. 5A and 5B illustrates an example of how the position of a human hand may be used for performing speech recognition according to one embodiment of the present invention. FIGS. 5A and 5B includes human arm 501, game sensor 502, an indication of the direction of the change of position 503, a first orientation of a human hand 504, a second orientation of a human hand 514, and a microphone 505. When the hand has changed position from the first orientation of the human hand 504 to the second orientation of the human hand 514, the game sensor senses the change and the system may user this information to select a first recognition set. This sensor may be a gyroscope, for example. Again referring to the video game example, a first recognition set may look like the following.

{sword, lance, fire}

This first recognition set may be a subset of a state recognition set. This state recognition set may look like the following.

{shield, stop, duck, jump, map, run, walk, left, right, sword, lance, climb tree, talk, ride, mount, borrow, steal, fire, call}

This selection of a first recognition set has been described in methods 200, 300, and 400. The selection occurs at 202, 304, and 404, respectfully, in regards to this example. The speech enters microphone 505. This would be used at 203, 305, and 405 in the aforementioned methods along with appropriate electronic circuitry (amplifier, analog-to-digital converter, etc. . . . ) in order to receive a speech input signal. Next, the speech input signal is recognized in the context of the first recognition set. This has been described previously.

Figure 6A:
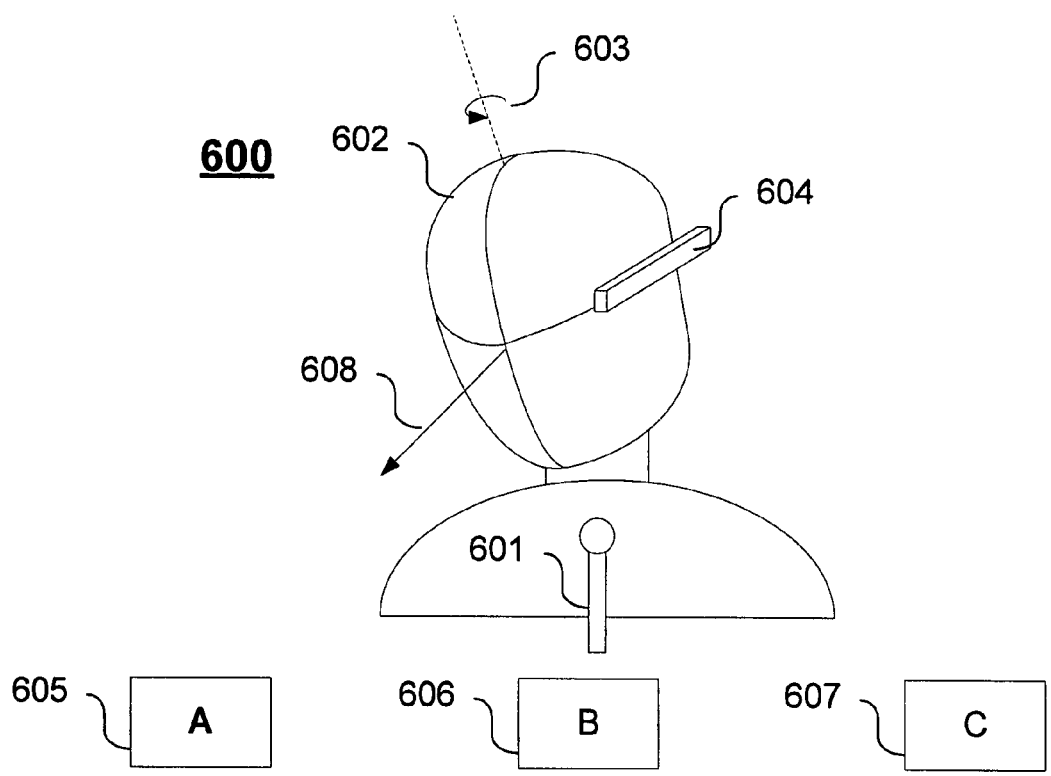
FIGS. 6A and 6B illustrates an example of how the position of a human head may be used for performing speech recognition according to another embodiment of the present invention.
Figure 6B:
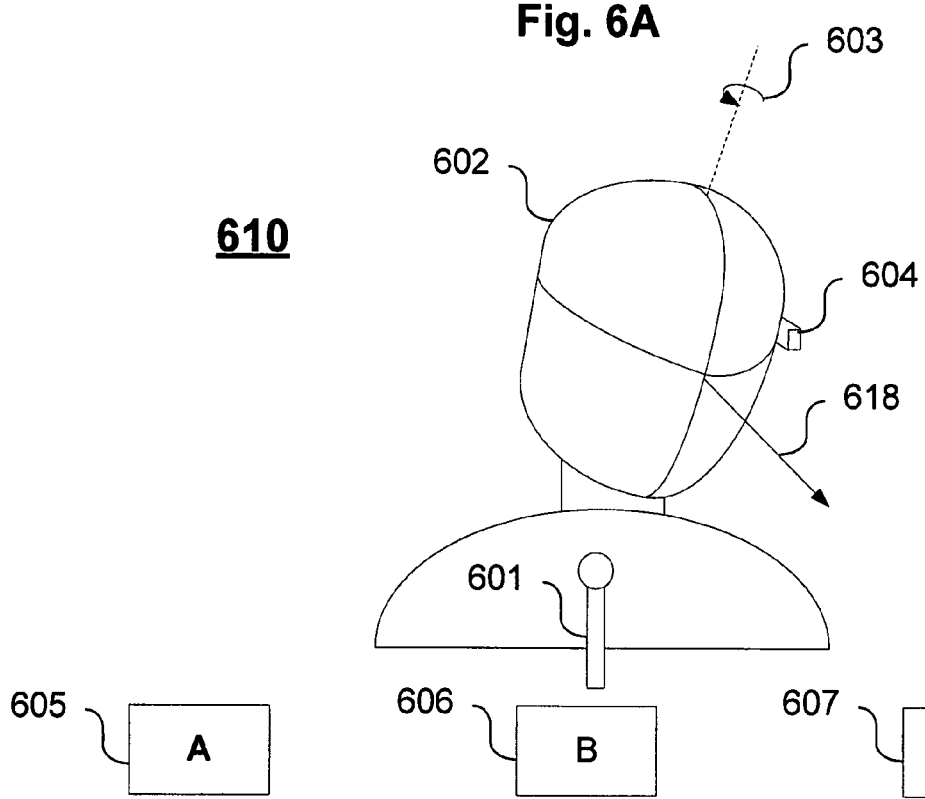

FIGS. 6A and 6B illustrates an example of how the position of a human head may be used for performing speech recognition according to another embodiment of the present invention. FIGS. 6A and 6B includes a microphone 601, a human head 602, a direction of rotation 603, a position sensing device 604 attached to said human head 602, instrument panel A 605, instrument panel B 606, instrument panel C 607, a first facing direction 608, and a second facing direction 618. In this embodiment, a human user having a human head 608 in a position 600 in which the human head is in the first facing direction 608 is speaking commands. Instrument panel A, B, and C may be panels which perform different functions in an automated manufacturing line, a monitoring station in a power plant, or a control room for a television broadcasting studio, for example. In this embodiment, position 600 is part of a first change in position. And according to this embodiment, a panel A recognition set has been selected based on a change to the first facing direction 608, and panel A recognition set includes commands associated with instrument panel A 605. In one example, instrument panel A 605 may be an instrument for controlling the lighting in a television studio and the panel A recognition set may look as follows.

{back lights, left lights, right lights, fade, up, down, sequence, one, two, three}

The human associated with said head 602 may say "back lights fade sequence two". Each segment of speech would be processed in the context of the panel A recognition set and the controls on the panel would command the lighting system to fade the back lights according to sequence two. This sequence may be a pre-programmed sequence which gives some desired affect in terms of how fast the back lights fade.

At some time the human associated with said head 602 may rotate in the direction 603 until said human head 602 is facing in the second facing direction 618. Sensor 604 would sense the change of position. And according to this example, a panel C recognition set may be selected based on a change to the second facing direction 618, and panel C recognition set includes commands associated with instrument panel C 607. In the television studio example, instrument panel C 607 may be an instrument for controlling the cameras in the television studio and the panel C recognition set may look as follows.

{front, camera, up, down, tilt, up, down, pan, left, right, sequence, one, two, three}

The human associated with said head 602 may say "left camera pan left left left". Each segment of speech would be processed in the context of the "panel A" recognition set and the controls on the panel may command the left camera to pan left three increments.

Figure 7:
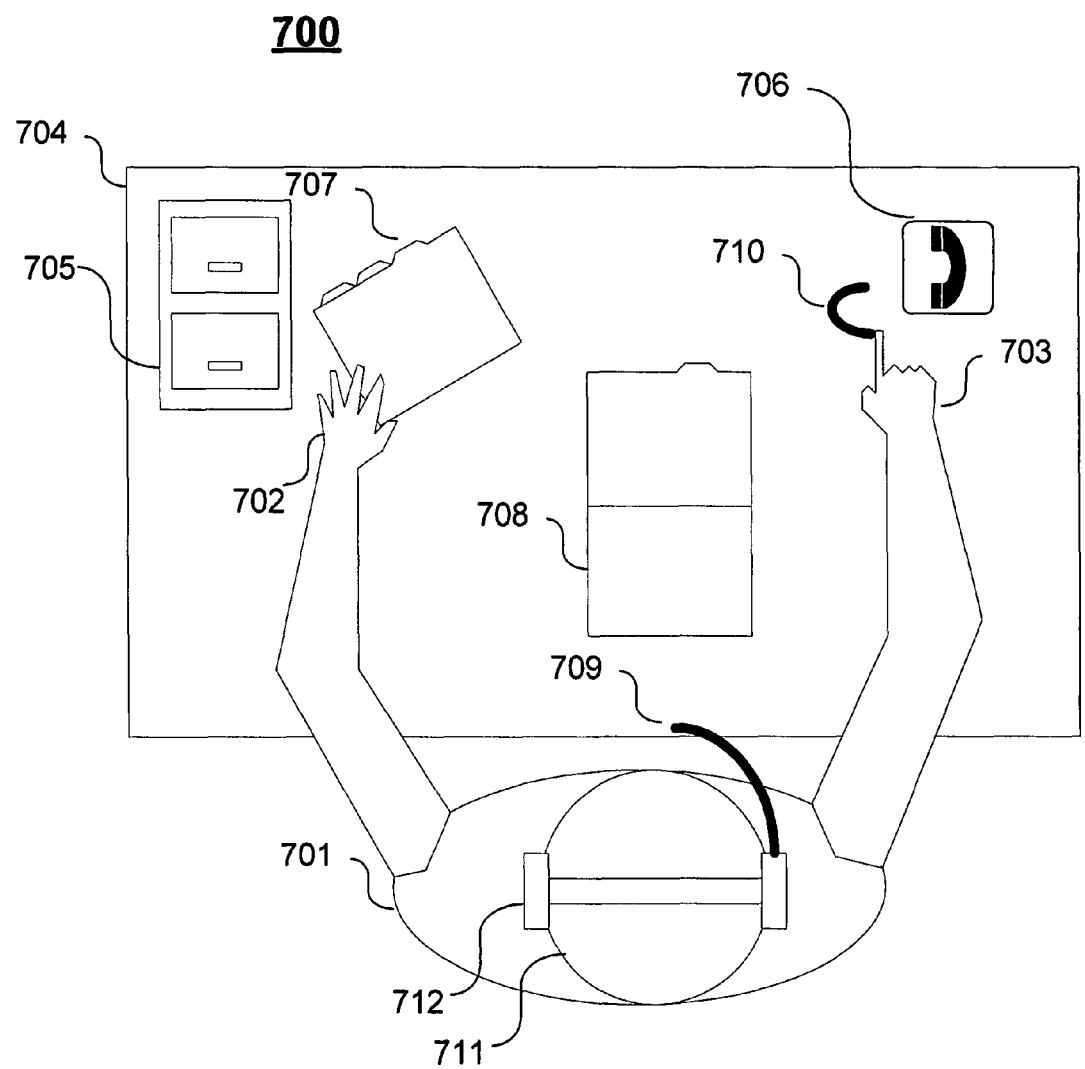
FIG. 7 illustrates another example of how the position of parts of a human body on a tactile screen may be used for performing speech recognition according to another embodiment of the present invention.

FIG. 7 illustrates another example of how the position of parts of a human body on a tactile screen may be used for performing speech recognition according to another embodiment of the present invention. This example, illustrates a surface computing application. FIG. 7 illustrates a scenario 700 which includes a human user 701, a tactile computer interface surface 704, and a microphone 709 attached to a headset 712. The human user 701 includes a left hand 702, a right hand 703, and a head 711. The human user 701 is wearing the headset 712 on his head 711. The tactile computer interface surface 704 may be integrated into a table or an office desk. Visible on the computer interface surface 704 is a virtual filing cabinet 705, a telephone symbol 706, a virtual stack of files 707, a virtual open file 708, and a shape 710 which denotes the sensing of a change of position of a portion of a human hand moving substantially along a portion of the tactile surface 704. This portion of the hand happens to be the index finger of the right hand 703 of the human user 701. In this example, the portion of the right hand is proximate with the computer interface surface 704.

In the scenario 700, human user 701 is manipulating the virtual stack of files 707 and reading the contents of the virtual open file 708. She realizes that something within the virtual open file 708 needs to be clarified and decides to call her client Carl Fiyel. She moves her right hand 703 to a portion of the tactile surface 704 proximate to the phone symbol 706. The tactile computer interface surface 704 senses the change of position. Since the change is in the vicinity of the phone symbol 706, a computer program selects a telephone recognition set. In this example the telephone recognition set may look as follows.

{call, redial, voicemail, line 1, line 2, hold, address book, home, Wilma, Peter Henry, Mom, Sister, Karl Nale, George Smith, Tom Jones, George Martinez, Carl Fiyel, Daniel Fihel, Marlo Stiles, Camp Fire Girls, Marlo Stiles, Sara Chen, Larry Popadopolis, Nina Nbeheru, Macey Epstein, etc . . . }

In this example, the people in the user's virtual telephone directory are part of the recognition set. If the human user 701 has many contacts, this set may contain hundred's of entries. The human user 701 now moves the index finger of her right hand 703 proximate with the tactile surface in a manner resembling the letter "C" 710. This change of position selects a snippet recognition set. This set may represent snippets or other types of segments of speech which correspond to the letter "C", for example. This set may look as follows.

{ca, ce, co, cu}

The human user 701 now utters the phrase, "Call Carl Fiyel" into microphone 709. A recognizer recognizes the resulting speech input signal in the context of the telephone recognition set and the snippet recognition set. First the recognizer may come up with an initial guess at the utterance, "Call Carl Fiyel". A possible first guess may be a set of ordered entries followed by the likelihoods associated with those entries. The top 5 entries may be part of this initial guess. The set may look as follows.

{Call Marlo Stiles, 452,
Call Carl Fiyel, 233,
Call Camp Fire Girls, 230,
Call Daniel Fiyel, 52,
Call Karl Nale, 34}

Next, the snippet recognition set may be used to weight this set of likelihoods according to how well they match the sound segments associated with the letter "C". The resulting reordered set may look as follows.

{Call Carl Fiyel, 723,
Call Camp Fire Girls, 320,
Call Marlo Stiles, 270,
Call Karl Nale, 143,
Call Daniel Fiyel, 125}

In this example, the recognizing of the speech input signal includes using the snippet recognition set to weight a set of likelihoods, wherein the snippet recognition set includes segments of speech. The highest weighted likelihood is taken as the recognition result and the system dials the number of Carl Fiyel located within a database accessible to the computer.

The human user talks to Carl Fiyel on headset 712 and clarifies the issue. The human user edits the virtual open file 708, closes the virtual file, and adds the file to the virtual stack of files 707. Since all the files relate to "D Industries", the human user 701 chooses to file them together. She moves the virtual stack of files 707 to the virtual filing cabinet 705. The tactile surface senses the change of position of the left hand 702 across the screen. The file manager program selects a file cabinet recognition set based on the motion of the left hand 702 and the state of the program running the system. The file cabinet recognition set may look as follows.

{file, other file, find, index, retrieve, copy, paste, subject, company, modified, created, owner, Walsh Industries, Company A, Company B, Firm C, D Industries, Miscellaneous Notes, Research Project A, Research Project B, George Smith, Tom Jones, George Martinez, Carl Fiyel, Daniel Fihel, Marlo Stiles, George Form, Sara Chen, Larry Popadopolis, Macey pstein, etc . . . }

In this example, a file manager program has included all the information associated with the different operations a user may wish to perform with the virtual filing cabinet 705. The human user 701 utters "file D Industries". The system converts this utterance into two smaller portions. A first speech input signal includes "file" and a second speech input signal includes "D Industries". In this example, the first speech input signal is considered a command. A subset of the file cabinet recognition set is selected based on the fact that this is the first speech input signal. This command recognition set may look as follows.

{file, find, index, retrieve, copy, paste}

The first speech input signal is recognized in the context of the command recognition set for the file manager program. This results in the "file" element being chosen as the recognition result. The file manager program now initiates an inventory of other states within other programs running within the system. Since the command "file" has been recognized, the system determines which files have been removed from the filing cabinet and which files have been created during this session of use and a scenario recognition set is selected which would include the possible choices for what the user may want to file. This scenario recognition set may look as follows.

{D Industries, Miscellaneous Notes, Carl Fiyel, Daniel Fihel, new, other}

There are six possibilities in filing this stack of files 707. The second speech input signal is recognized in the context of the scenario recognition set. "D Industries" element is chosen as the recognition result. This may result in selecting a new the state of a file manager program and initiating a routine within this new state. This may include storing the stack of files 707 into the "D Industries" folder. Initiating a new state of the file manager program may begin the method of selecting another recognition set based on the new state of the file manager program.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A speech recognition method comprising:
    sensing a change of position of at least one part of a human body, the sensing being performed by a gyroscope, wherein the gyroscope senses said change in position through physical contact with said at least one part of the human body;
    selecting, by a controller, a speech recognition set based on the change of position, the speech recognition set specifying a set of words to be recognized, wherein when the gyroscope indicates that at least one part of the human body is in a first position, a first speech recognition set is selected to recognize a first set of words, and wherein when the gyroscope indicates that the at least one part of the human body is in a second position, a second speech recognition set is selected to recognize a second set of words different from the first set of words;
    receiving a speech input signal; and
    recognizing the speech input signal in the context of the selected speech recognition set, the recognizing resulting in a recognition result.

2. The method of claim 1 wherein the change of position includes a change in orientation.

3. The method of claim 1 wherein the change of position includes a change in direction.

4. The method of claim 1 wherein the change of position includes motion.

5. The method of claim 1 wherein the second speech recognition set is a subset of the first recognition set.

6. The method of claim 1 wherein selecting the speech recognition set comprises selecting a subset of words from a state recognition set for a computer program, the state recognition set comprising a set of words corresponding to available options of the computer program when the computer program is in a particular state.

7. The method of claim 1 further comprising:
    sensing a second change in position of at least one part of a human body; and
    modifying the recognition result based on the second change in position.

8. The method of claim 1 further comprising:
    initiating a state of a computer program; and
    selecting a state recognition set based on the state of the computer program,
    wherein the selecting of the first recognition set includes finding a subset of the state recognition set.

9. The method of claim 8 wherein the change of position includes a change in orientation.

10. The method of claim 8 wherein the change of position includes a change in a direction.

11. The method of claim 8 wherein the change of position includes motion.

12. The method of claim 8 wherein the recognizing includes choosing a select element from the first recognition set.

13. The method of claim 8 further comprising changing the state of the computer program according to the recognition result.

14. The method of claim 1 wherein the speech input signal includes digital data.

15. The method of claim 1 wherein the first recognition set includes segments of sound data.

* * * * *